United States Patent
Dai et al.

(10) Patent No.: US 8,335,371 B2
(45) Date of Patent: Dec. 18, 2012

(54) METHOD FOR VISION FIELD COMPUTING

(75) Inventors: Qionghai Dai, Beijing (CN); Di Wu, Beijing (CN); Yebin Liu, Beijing (CN)

(73) Assignee: Tsinghua University, Beijing (CN)

( * ) Notice: Subject to any disclaimer, the term of this patent is extended or adjusted under 35 U.S.C. 154(b) by 232 days.

(21) Appl. No.: 12/978,710

(22) Filed: Dec. 27, 2010

(65) Prior Publication Data

US 2011/0158507 A1   Jun. 30, 2011

(30) Foreign Application Priority Data

Dec. 28, 2009 (CN) .......................... 2009 1 0243557

(51) Int. Cl.
- G06K 9/00 (2006.01)
- G06K 9/32 (2006.01)
- G06K 9/03 (2006.01)
- G06T 15/00 (2011.01)
- G06T 15/10 (2011.01)
- H04N 13/00 (2006.01)
- H04N 7/18 (2006.01)

(52) U.S. Cl. ........ 382/154; 382/107; 382/299; 382/312; 345/419; 345/427; 348/42; 348/155

(58) Field of Classification Search .............. 382/106, 382/100, 107, 154, 103, 276, 293, 298, 299, 382/284, 312, 254, 155, 159, 224, 173, 190; 348/36, 48, 42, 46, 47, 222.1, 159, 161, 394.1, 348/143, 155, 581, 239, 229.1, 587, 586, 348/585, 590, 169; 345/629, 427, 156, 418, 345/419, 420, 421, 422, 423, 424, 425, 426

See application file for complete search history.

(56) References Cited

U.S. PATENT DOCUMENTS

| | | | | |
|---|---|---|---|---|
| 7,113,185 B2 * | 9/2006 | Jojic et al. | ...................... | 345/420 |
| 7,574,019 B2 * | 8/2009 | Mittal et al. | ................... | 382/103 |
| 7,680,353 B2 * | 3/2010 | Jojic et al. | ...................... | 382/254 |
| 7,750,903 B2 * | 7/2010 | Jojic et al. | ...................... | 345/420 |
| 7,940,264 B2 * | 5/2011 | Jojic et al. | ...................... | 345/420 |
| 8,106,924 B2 * | 1/2012 | Aliprandi et al. | ............. | 345/629 |

* cited by examiner

Primary Examiner — Sheela Chawan (74) Attorney, Agent, or Firm — Morgan, Lewis & Bockius LLP (57) ABSTRACT

A method for vision field computing may comprise the following steps of: forming a sampling system for a multi-view dynamic scene; controlling cameras in the sampling system for the multi-view dynamic scene to perform spatial interleaved sampling, temporal interleaved exposure sampling and exposure-variant sampling; performing spatial intersection to the sampling information in the view subspace of the dynamic scene and temporal intersection to the sampling information in the time subspace of the dynamic scene to reconstruct a dynamic scene geometry model; performing silhouette back projection based on the dynamic scene geometry model to obtain silhouette motion constraints for the view angles of the cameras; performing temporal decoupling for motion de-blurring with the silhouette motion constraints; and reconstructing a dynamic scene 3D model with a resolution larger than nominal resolution of each camera by a 3D reconstructing algorithm.

13 Claims, 7 Drawing Sheets

S101: Constructing multi-view dynamic scene sampling system

S102: Perform spatial interleaved sampling, temporal interleaved exposure sampling and exposure-variant sampling using dynamic scene sampling system S103: performing spatial intersection and/or temporal intersection to reconstruct dynamic scene geometry model S104: performing silhouette back projection based on the dynamic scene geometry model to obtain silhouette motion constraints S105: performing temporal decoupling for motion de-blurring to images in the sampling information with the silhouette motion constraints S106: reconstructing a dynamic scene 3D model with a resolution larger than nominal resolution of each camera by a 3D reconstructing algorithm

METHOD FOR VISION FIELD COMPUTING

This application claims priority to, and benefits of Chinese Patent Application No. 200910243557.7 filed with the State Intellectual Property Office of P.R.C. on Dec. 28, 2009, the entire content of which is incorporated herein by reference.

BACKGROUND OF THE DISCLOSURE

1. Field

The present disclosure generally relates to computer vision and graphics visual signal processing, and more particularly to a method for vision field computing.

2. Background

Since the first large-scale camera array system was founded by Kanade at Carnegie Mellon University in 1997, camera array based multi-view dynamic capturing systems and applications thereof have become rapidly developing research focuses in the cross field of computer graphics and computer visioning. Zitnick et al at Microsoft Research has established an 8-camera capturing system and the scene modeling performance with high-quality thereof has been proven. In 2007, Starck at the University of Surrey has established a 3D capturing system for a dynamic body, please rf. *Surface Capture for Performance-Based Animation,* 2007, Computer Graphics and Applications. Conventional camera array systems are all operated by triggering all the cameras synchronously to capture scene simultaneously. Wilburn et al at Stanford University has designed a system for capturing any sample in a spatiotemporal volume of a view to generate a high-speed video based on optical field interpolation and optical flow deforming And more and more research in computer graphics and computer vision has been focused on a multi-camera capturing system by capturing real dynamic scenes. The free viewpoint video has been realized recently, the viewpoint and the observation direction in the visual media may be selected freely by users, and the depth may be perceived so as to experience real sensation.

A conventional video camera with a highest frame rate of about 30 frames per second is used in the above multi-camera systems, which may limit the motion speed of a dynamic scene which may be effectively captured to a large extent. When the motion velocity of a scene is higher than the highest capture frame rate of the capturing system, motion blur may occur in the captured image. Current mainstream 3D reconstruction algorithms are all based on feature matching. However, the feature matching may not be performed in the case of motion blur, and consequently effective perception of the dynamic scene may not be realized accordingly.

With the continuous popularity of industrial grade cameras, it becomes possible to dynamically capture a 3D scene in real world. However, a high-speed camera with a frame rate of above about 500 frames per second is extremely expensive, and the cost of constructing a multi-view high-speed camera capturing system is rendered very high.

SUMMARY

The present disclosure is directed to solve at least one of the problems existing in the prior art. Accordingly, a method for vision field computing may be provided, which may realize effective and cost efficient perception and capture for a dynamic scene with high speed using conventional cameras.

According to an aspect of the present disclosure, a method for vision field computing may be provided. The method may comprise steps of: (1) forming a sampling system for a multi-view dynamic scene comprising N cameras discretely distributed in the dynamic scene for acquiring a vision field corresponding thereto, wherein view angles of the cameras entirely cover the dynamic scene, and the N is larger than 2; (2) controlling the cameras in the sampling system for the dynamic scene to perform spatial interleaved sampling, temporal interleaved exposure sampling and exposure-variant sampling in view-time 2D vision field subspace of the dynamic scene to acquire sampling information of the vision field subspaces in the dynamic scene from the view angles of the cameras; (3) performing spatial intersection to the sampling information in the view subspace of the dynamic scene and temporal intersection to the sampling information in the time subspace of the dynamic scene to reconstruct a dynamic scene geometry model corresponding to the multi-view dynamic scene; (4) performing silhouette back projection to the view angles of the cameras where the sampling information of the dynamic scene is obtained based on the dynamic scene geometry model to obtain silhouette motion constraints for the view angles of the cameras; (5) performing temporal decoupling for motion de-blurring to images in the sampling information with the silhouette motion constraints; and (6) reconstructing a dynamic scene 3D model corresponding to the multi-view dynamic scene with a resolution larger than nominal resolution of each camera by a 3D reconstructing algorithm According to some embodiments of the present disclosure, by spatial interleaved sampling, temporal exposure sampling and exposure-variant sampling, using the intrinsic unified consistency between the spatial silhouette projection intersection and the exposure temporal intersection, the effective perception and capture for the dynamic scene with high speed may be achieved with conventional cameras, which is cost efficient and convenient to be put into practice. According to the above embodiments of the present disclosure, without using expensive industrial grade cameras, high-speed dynamic capture for the real 3D scene may also be realized, thereby having very high commercial value with wide applicability.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION OF THE EMBODIMENTS OF THE DISCLOSURE

Reference will be made in detail to embodiments of the present disclosure. The embodiments described herein with reference to the accompany drawings are explanatory and illustrative, which are used to generally understand the present disclosure. The embodiments shall not be construed to limit the present disclosure. The same or similar elements and the elements having same or similar functions are denoted by like reference numerals throughout the descriptions.

The inventive concept of the present disclosure may lie in the sampling mechanism of a view-time 2D visual field and a reconstruction framework. And the temporal decoupling concept and method for implementing the same are presented herein for the first time based on intrinsic unified consistency between spatiotemporal intersections. In the following, a method for vision field computing using the inventive concept as proposed hereinbefore will be described in detail.

Figure 1:
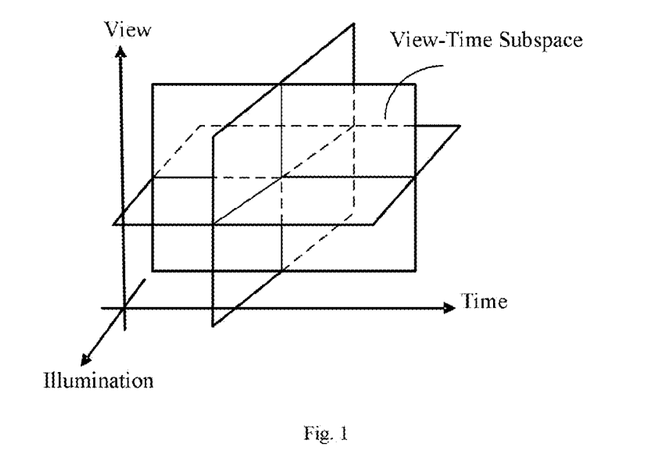
FIG. 1 is a schematic view showing a 3D vision field space in the art.

The present disclosure is directed to sampling and reconstruction of view-time 2D subspace in view-time-illumination 3D vision field space. It should be noted that vision field, firstly proposed by inventors of the present disclosure, is a data format or representation for problems of acquisition and reconstruction of real-world visual information. Vision field involves researches where image, vision and graphics meet, and is the full space on which vision and graphics problems define. It is a 3D space spanned by time, light and view. Each element or point in the 3D field is an image obtained by a camera or computational camera at a certain time under a view with a predetermined illumination, as shown in FIG. 1. In addition, a plane perpendicular to illumination axis in the 3D vision field space represent the view time 2D subspace.

"Vision field computing" refers to the acquisition (aka signal processing), analysis (aka computer vision) and the synthesis (aka computer graphics) of a visual scene. The acquisition may be described as vision field sampling while the analysis and the synthesis may be combined and defined as vision field reconstruction. Also, more information on vision filed and/or vision field computing may be available on website: http://media.au.tsinghua.edu.cn/vfc.htm, which is hereby entirely incorporated by reference.

In the following, fundamentals of the vision field will be further described with reference to FIGS. 1 and 2. The 1D subspace of the vision field consists of three kinds of researches focusing on the view, light or illumination and time dimension respectively. For example, when the view and the light are set invariant, we have video sequence analysis and synthesis is performed on the time dimension. Video analysis includes optical flow while video synthesis is the interpolation or reconstruction or decoding of a video sequence. Similarly, for the view dimension, when the light and the time are fixed, the stereo matching, image based-rendering and multi-view stereo are performed. At last, there are image based relighting, reflectance measurement, high dynamic imaging and photometric stereo problems for the light or illumination dimension.

Figure 2:
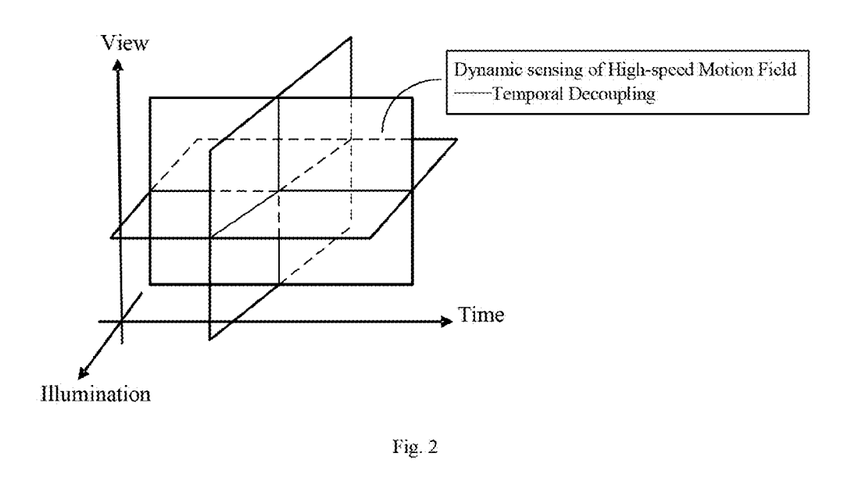
FIG. 2 is a schematic view for temporal decoupling in the 3D vision field shown in FIG. 1.

In the 2D subspace, there are three planes on which vision and graphics problems are defined, which are shown in FIGS. 1 and 2 respectively. The first is defining the view-time space with problems such as free-viewpoint video, dynamic light field and performance capture. The second relates to the view-light space which implies the multi-view photometric stereo and 3D object relighting problems. For the third light-time 2D subspace, it still has not been well-investigated but still available works such as time-varying photometric stereo are proposed. In the following the method for vision field computing according to an embodiment of the present disclosure will be described in detail with reference to accompanying figures.

As shown in FIG. 1, the vision field comprises view-time-light 3D space. Each element in the vision field space is a two-dimensional image. As shown in FIG. 2, by using circularly arranged camera array, which may be used for performing spatial interleaved sampling, temporal exposure sampling and exposure-variant sampling, based on the intrinsic unified consistency between the spatial silhouette projection intersection and the exposure temporal intersection, the temporal decoupling is performed to obtain a 3D model, i.e. dynamic scene geometry model, with increased temporal resolution, thus realizing the calculation of the view-time 2D vision field subspace. Therefore, the core idea of the present disclosure, as described hereinabove, lies in the design and realization of the sampling mechanism and the reconstruction of the view-time 2D vision field subspace for the multi-view dynamic scene.

In viewing thereof, a method for vision field computing may be provided. The method may comprise the following steps of: forming a sampling system for a multi-view dynamic scene comprising N cameras discretely distributed in the dynamic scene for acquiring the vision field, view angles of the cameras entirely cover the dynamic scene, and N>2; controlling the cameras in the sampling system for the multi-view dynamic scene to perform spatial interleaved sampling, temporal interleaved exposure sampling and exposure-variant sampling in view-time 2D vision field subspaces in the dynamic scene to acquire sampling information of the vision field subspaces in the dynamic scene; performing temporal and spatial intersections to the sampling information of the vision field subspace based on intrinsic unified consistency between spatial silhouette projection intersection and exposure temporal intersection to obtain sampling information of a time subspace in the vision field subspace and a reconstruction of a view subspace in the vision field subspace so that a scene model corresponding to short exposure is obtained; and acquiring silhouette motion constraints of each view in an original exposure time period to the scene model obtained in the previous step by silhouette back projection of each view, and constructing a 3D model of the dynamic scene by a 3D reconstruction algorithm after the temporal decoupling for motion de-blurring to the silhouette motion.

Figure 3:
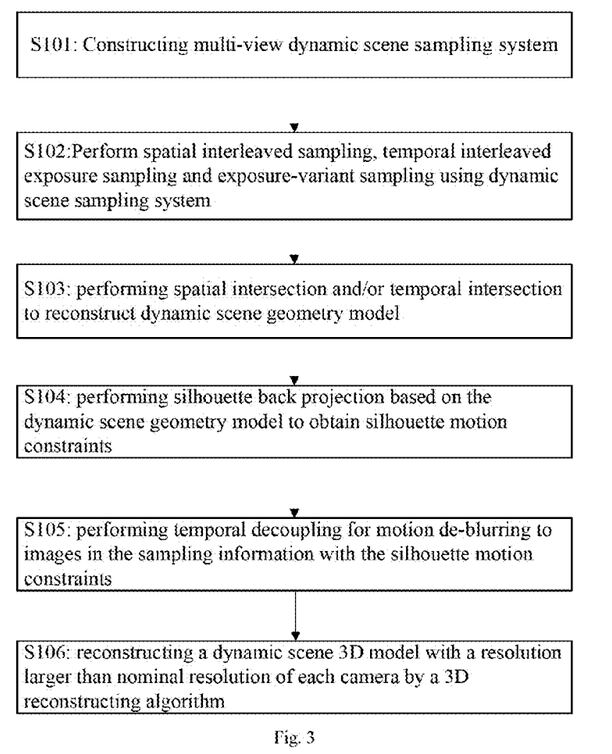
FIG. 3 is a flow chart of a method for vision field computing according to an embodiment of the present disclosure.

The method will be described in detail in the following with reference to FIG. 3. As shown in FIG. 3, the method for vision field computing may comprise the following steps:

forming a sampling system for a multi-view dynamic scene comprising N cameras discretely distributed in the dynamic scene for acquiring a vision field corresponding thereto, wherein view angles of the cameras entirely cover the dynamic scene, and the N is larger than 2 (Step 101);

controlling the cameras in the sampling system for the dynamic scene to perform spatial interleaved sampling, temporal interleaved exposure sampling and exposure-variant sampling in view-time 2D vision field subspace of the dynamic scene to acquire sampling information of the vision field subspaces in the dynamic scene from the view angles of the cameras (Step 102);

performing spatial intersection to the sampling information in the view subspace of the dynamic scene and/or temporal intersection to the sampling information in the time subspace of the dynamic scene to reconstruct a dynamic scene geometry model corresponding to the multi-view dynamic scene (Step 103);

performing silhouette back projection to the view angles of the cameras where the sampling information of the dynamic scene is obtained based on the dynamic scene geometry model to obtain silhouette motion constraints for the view angles of the cameras (Step 104);

performing temporal decoupling for motion de-blurring to images in the sampling information with the silhouette motion constraints (Step 105); and reconstructing a dynamic scene 3D model corresponding to the multi-view dynamic scene with a resolution larger than nominal resolution of each camera by a 3D reconstructing algorithm (Step 106).

In the following, the steps as described hereinabove will be discussed in detail in the following with reference to FIGS. 4-11.

In step S101, the sampling system for the multi-view dynamic scene may comprise a plurality of cameras, such as N where N is a positive integer larger than 2, discretely distributed in the dynamic scene. And views of the cameras cover the entire dynamic scene.

Obviously, the number of the cameras may be less or more, and may be varied or determined by actual requirement of the dynamic scene. The larger the dynamic scene, the larger the number of the cameras is. However, it is required that the visual field of all the cameras may cover the entire dynamic scene. In general, the cameras are circularly disposed in the dynamic scene. In some embodiments, the cameras may be not circularly disposed, and may be not disposed on one plane, provided that view angles of the cameras overlapped may entirely cover the dynamic scene.

According to an embodiment of the present disclosure, the exposure time of all the cameras may be precisely controlled, and all the cameras have high-precision synchronous control system. For example, under the high spatial resolution such as 1024×768, the video camera may have the highest frame rate of 25 frames per second with the exposure time thereof being precisely controllable.

Figure 4:
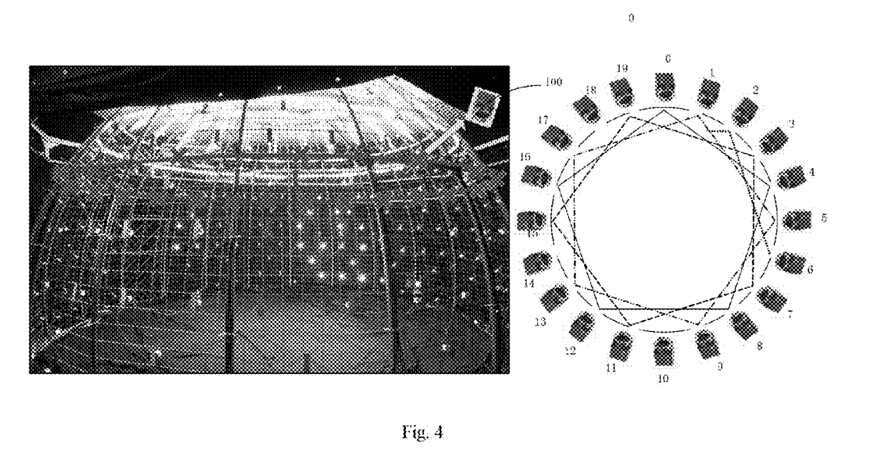
FIG. 4 is a schematic view of a multi-view dynamic scene sampling system used in the method as shown in FIG. 3.

As shown in FIG. 4, a semispherical sampling system has a diameter of about 6 in is shown. On a plane of a circle 100 shown in FIG. 4, the cameras 20 are circularly arranged with each "X" representing a camera for sampling. The circular array is consisted of 20 cameras 0-19, which are circularly disposed on a horizontal plane of the dynamic scene with a height of about 2 in away from the ground. The plan view of the semispherical sampling system is shown at the right side in FIG. 4, and the view angles of all the cameras entirely cover the space of the scene.

Step S102: controlling the cameras in the sampling system for the dynamic scene to perform spatial interleaved sampling, temporal interleaved exposure sampling and exposure-variant sampling in view-time 2D vision field subspace of the dynamic scene to acquire sampling information of the vision field subspaces in the dynamic scene from the view angles of the cameras.

Because of the cameras having a limited information size, different strategies may be adopted to obtain or sample enough information for later synthesis and representation of the dynamic scene. Therefore, spatial interleaved exposure sampling, temporal interleaved exposure sampling and exposure-variant sampling are used for acquiring more information in the multi-view dynamic scene.

In Step S102, the cameras in the multi-view dynamic scene sampling system are controlled to perform spatial interleaved exposure sampling, temporal interleaved exposure sampling and exposure-variant sampling in view-time vision field subspace of the dynamic scene to acquisit the sampling information of the vision field subspaces in the dynamic scene.

While performing optimized sampling in view-time 2D vision field subspace of the dynamic scene, it is required to contain as much information reflecting the essentials of the vision field as possible under a limited volume of the sampling information due to the cameras with lower resolution being used. Therefore, it is necessary to distribute sampling points as widely and representationally as possible in the critical areas of the vision field subspace. For this reason, it is vital to perform optimized spatial sampling, temporal sampling and exposure-variant sampling for the given dynamic scene.

For example, the cameras 0-19 are circularly distributed on the plane 100 in the dynamic scene and the exposure sampling is performed successively by cameras at an interval of K to realize the spatial interleaved sampling, where K<(N−2), so that sampling information of the dynamic scene in motion is obtained with the interleaved sampling cameras. According to an embodiment of the present disclosure, the above sampling system for the multi-view dynamic scene may comprise 20 cameras, and spatial exposure sampling thereof may be performed in turn by the cameras at an interval, such as 7, to realize the spatial interleaved sampling.

Figure 5:
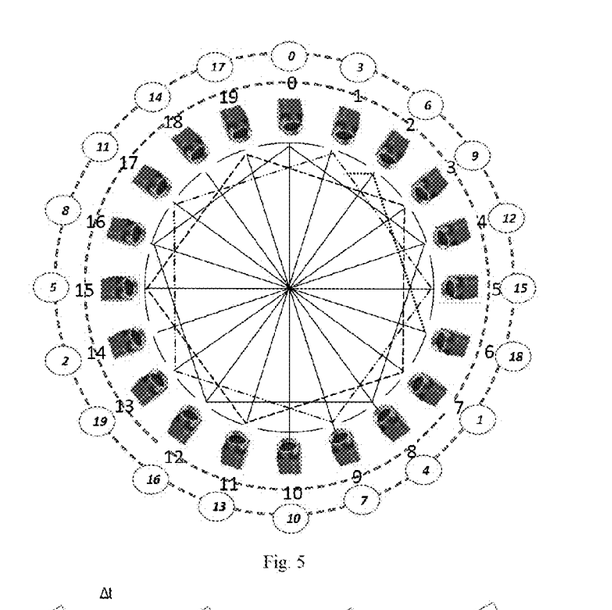
FIG. 5 is a distributing view of cameras in the multi-view dynamic scene sampling system shown in FIG. 4.

Referring to FIG. 5, the spatial interleaved sampling has the purpose of avoiding the insufficient sampling of rapid directional motion of the dynamic scene. When the dynamic scene moves with strong directional motion or in a narrow space, spatial motion information near a part of cameras in the motion direction may be lost during neighboring spatial sampling, resulting in insufficient sampling information of the dynamic scene. As shown in FIG. 5, according to an embodiment of the present disclosure, each number on the dotted line of the inner circle designates a camera respectively, i.e. from 0 to 19 that is, 20 cameras in total, and each number on the dotted line of the outermost circle corresponds to the spatial interleaved sampling sequence: 0→7→14→1→8→15→2→9→16→3→10→17→4→11→18→5→12→19→6→13→0, i.e. at an interval of 7.

According to an embodiment of the present disclosure, the step of performing the temporal interleaved exposure sampling may comprise: performing exposure sampling successively with the first exposure time at a time interval $\Delta t$ by the cameras in an order that is performed in the spatial interleaved sampling where a sampling period is completed when each camera in the sampling system is performed with exposure sampling once, the sum of the time intervals $\Delta t$ and the exposure time entirely cover the time subspace of the dynamic scene.

Figure 6:
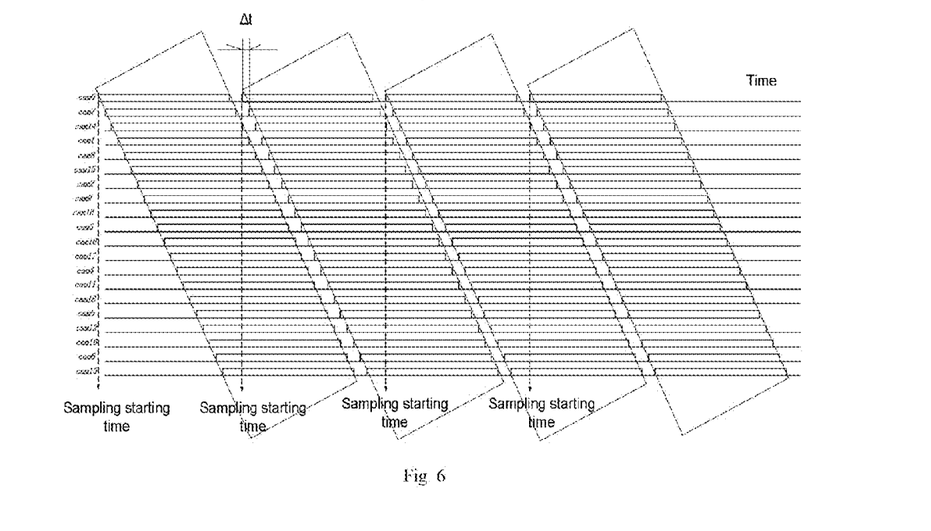
FIG. 6 is a timing sequence diagram for temporal interleaving exposure in a time subspace according to an embodiment of the present disclosure.

In particular, in order to improve the temporal resolution of the dynamic scene with high-speed motion, the temporal interleaved exposure sampling is used, exposure sampling is performed successively by 20 cameras in an order that is performed in the spatial interleaved sampling at the time interval of Δt, so that time sampling points for the sampling system and the corresponding exposure time thereof may be designed to cover the time subspace of the dynamic scene, overcoming shortcomings of synchronous exposure sampling for the temporal information of the dynamic scene. For example, as shown in FIG. 6, each camera sampling is represented by a time axis, with a high level signal on the time axis representing an exposure time of a corresponding camera whereas a low level signal representing the time interval between neighboring camera exposures. Due to intrinsic data transmission between neighboring camera exposures, there is a certain short time interval between the neighboring exposure time periods. For simplicity, the short time interval thereof is omitted sometimes in the following description. The twenty cameras are triggered successively until the exposure of all the cameras is completed, thereby forming the sampling period as defined hereinabove, which is represented by an oblique rectangular region in FIG. 6. Each black vertical dotted line represents starting time of the sampling period, i.e., the starting exposure time of the first camera in the sampling period. Then each camera exposure sampling is triggered successively in an order that is performed in the spatial interleaved sampling at a time interval Δt as described above. In the following, the time interval Δt may be deemed as a short exposure time period for the dynamic scene geometry model which will be described in detail hereinafter.

performing exposure sampling to the dynamic scene by the cameras in the sampling system, where at least one camera has the first exposure time $T_1$ satisfying $T_1 < T_{max}$ in which $T_{max}$ is a longest exposure time under the highest frame rate of the cameras, and at least another camera has a second exposure time $T_2$ satisfying $0 < T_2 < T_1$ during each sampling period.

Obviously, the length of the exposure time, i.e. the long exposure time or the short exposure time, is relative, and may be selected according to the particular dynamic scene. For example, while the dynamic scene is moved with high-speed, it is required that the short exposure time is as short as possible under the highest possible signal to noise ratio for the adopted cameras, so as to acquire effective information from the dynamic scene with high-speed motion.

In particular, because the motion speed of the scene exceeds the highest frame rate of the cameras, while sampling each frame by using the longest exposure time under the highest frame rate limitation, motion blurring will occur inevitably, but the images acquired may have high signal to noise ratio, so that the intrinsic noise of the cameras may be omitted. On the contrary, when the dynamic scene is sampled with short exposure time period, such as the second exposure time $T_2$, the motion blurring may be avoided. However, because the light information received by each camera is so little that the intrinsic noise of the cameras may not be omitted, so that the aquisited images may have very low signal to noise ratio. In order to compromise the dilemma as encountered hereinabove, at least a camera in the sampling system samples with short exposure time, such as the second exposure time $T_2$, which may provide stronger constraints for the subsequent de-blurring of the motion blurring images obtained by the cameras in the sampling system with long exposure time, such as the first exposure time $T_1$.

Figure 7A:
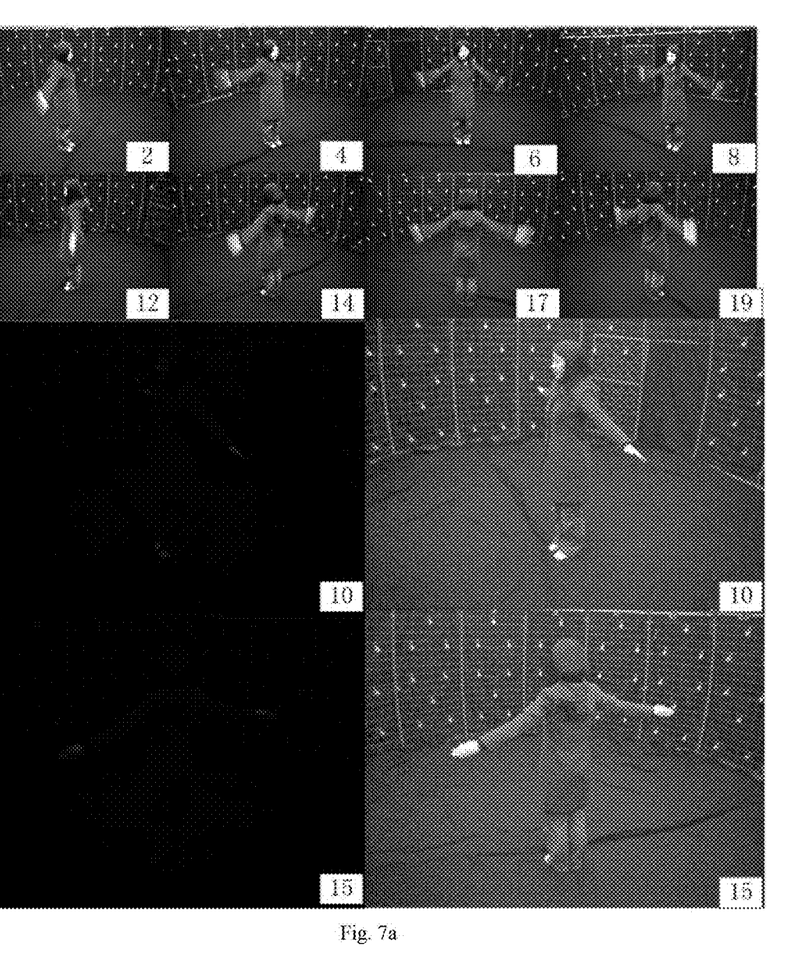
FIG. 7*a* is a schematic view of actual photographs of exposure-variant sampling in a high-speed motion scene under different view angles according to an embodiment of the present disclosure.
Figure 7B:
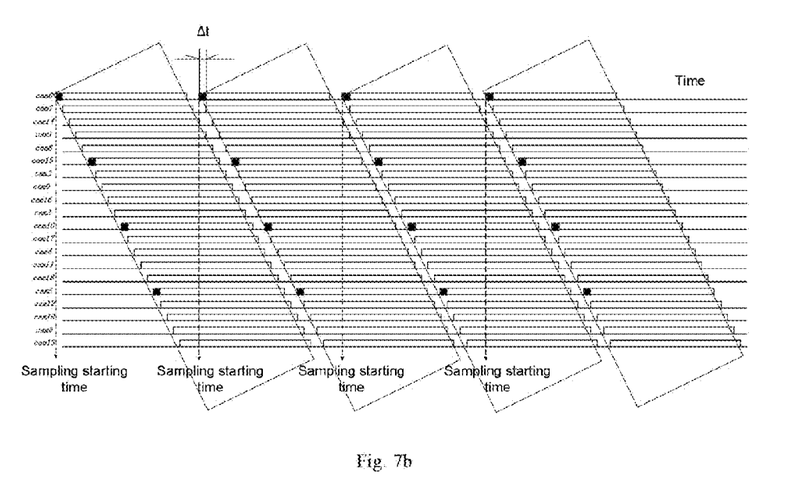
FIG. 7b is a schematic view of short-time exposure sampling of cameras from different view angles according to an embodiment of the present disclosure.

As shown in FIG. 7a, the images in the former two rows are the multi-view images aquisited by cameras with the long exposure time, the number legend in the lower right corner of the images may designate the corresponding camera, and as shown in the images thereof, there is little noise in the images whereas the motion image is blurred obviously. And the images in the rear two rows are the images aquisited by cameras with the short exposure time from two views and the images thereof are treated by brightness enhancement respectively, and the motion is not blurred. However, the images have very low signal to noise ratio. As shown in FIG. 7b, according to an embodiment of the present disclosure, the cameras at the $0^{th}$, $5^{th}$, $10^{th}$ and $15^{th}$ positions may sample the dynamic scene with short exposure time, such as the second exposure time $T_2$, which are represented by black solid boxes in FIG. 7b.

Step S103: performing spatial intersection to the sampling information in the view subspace of the dynamic scene and/or temporal intersection to the sampling information in the time subspace of the dynamic scene to reconstruct a dynamic scene geometry model corresponding to the multi-view dynamic scene.

In step S103 aims to provide a dynamic scene geometry model by performing spatial intersection to the sampling information in the view subspace of the dynamic scene and/or temporal intersection in the time subspace of the dynamic scene. The dynamic scene geometry model may have a time resolution larger than that of the nominal resolutions of the cameras, so that it may found a basis for obtaining silhouette motion constraints for the view angles of the cameras, and further for reconstructing a dynamic scene 3D model.

Because, at each time point, there is only one solid outline for the dynamic scene, there is intrinsically unified consistency between the spatial silhouette projection intersection and exposure temporal intersection. Based on intrinsic unified consistency between the spatial silhouette projection intersection and the exposure temporal intersection, temporal and spatial intersections may be performed. That is, temporal intersection to the sampling information of the view subspace for the dynamic scene may be performed to obtain the dynamic scene geometry model with sampling information of nominal resolutions exceeding those of the cameras in a time subspace of the view-temporal 2D subspaces for the dynamic scene. And/or the spatial intersection may be performed by an image silhouette visual hull algorithm to obtain the dynamic scene geometry model with the short exposure time, such as a third exposure time $T_2$, so as to achieve reconstruction of the view subspace for the dynamic scene.

According to an embodiment of the present disclosure, the step of performing the temporal intersection or temporal decoupling intersection to the sampling information in the dynamic scene may comprise steps of: performing time based decoupling intersection to silhouettes of images obtained in neighboring sampling periods for the cameras in the sampling system to obtain the dynamic scene geometry model with a short exposure time less than the original exposure time, the dynamic scene geometry model has a time resolution larger than that of the nominal resolutions of the cameras. To be specific, if, in an ideal condition, the original camera itself has a highest frame rate of F, and the sampling system comprises N cameras, the temporal resolution of F×N may be acquired by the above sampling information with the short exposure time.

Figure 8:
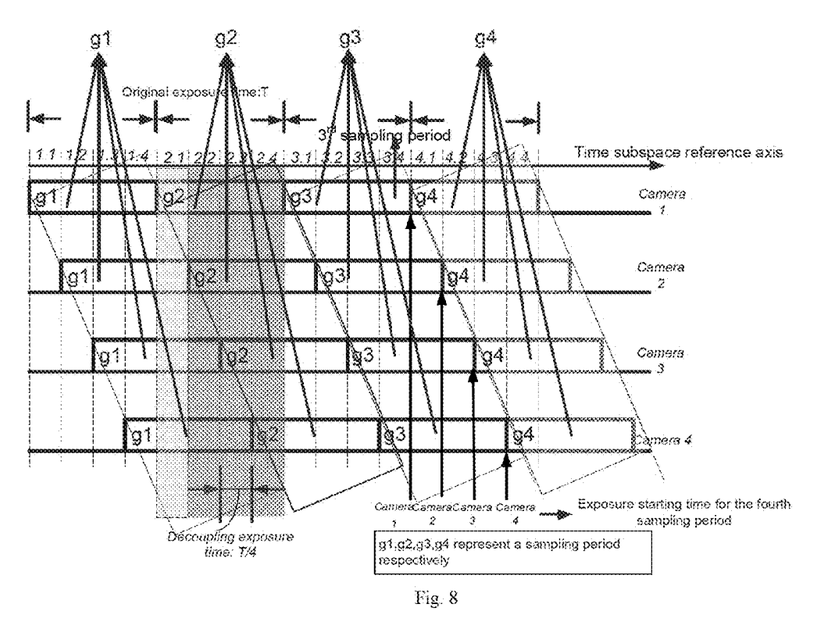
FIG. 8 is a schematic view showing temporal decoupling mechanism for acquiring a model scene with temporal high resolution by performing time subspace intersection according to an embodiment of the present disclosure.

FIG. 8 is a schematic view showing temporal decoupling mechanism for acquiring dynamic scene geometry model by performing time subspace intersection according to an embodiment of the present disclosure. The realization of the temporal intersection for obtaining the temporal super-resolution of may be as follows. The temporal intersection to the sampling information in the time subspace of the dynamic scene may be as follows to reconstruct a dynamic scene geometry model corresponding to the multi-view dynamic scene. The dynamic scene geometry model may have a short exposure time smaller than the original exposure time, i.e. the first exposure time, of the cameras. As shown in FIG. 8, Temporal intersection for each camera is performed by selecting exposure time at different sampling periods to obtain continuous images with the short exposure time, such as T/4 shown in FIG. 8, which may be used for obtaining the dynamic scene geometry model, thus realizing the time subspace with a resolution larger than those provided by the cameras. As shown in FIG. 8, taking four cameras for example, exposure time decoupling is performed, and the intersection strategy is shown in Table 1. For example, for the temporal decoupling intersection at the time t2.1, images obtained at neighboring different sampling periods g2, g2, g1 and g1 for the cameras 1, 2, 3 and 4 are intersected to complete the temporal decoupling accordingly. Corresponding temporal decoupling intersections are performed for the short exposure time t2.2, t2.3, t2.4 so that the dynamic scene geometry model with the short exposure time T/4 may be obtained for the second sampling period. Table 1 shows the exemplary solution for temporal decoupling intersection corresponding to time model shown in FIG. 8.

TABLE 1

Exemplary solution for temporal decoupling intersection corresponding to time model shown in FIG. 8

| Camera | Decoupling exposure time | | | |
|---|---|---|---|---|
| | t2.1 | t2.2 | t2.3 | t2.4 |
| Camera 1 | g2 | g2 | g2 | g2 |
| Camera 2 | g1 | g2 | g2 | g2 |
| Camera 3 | g1 | g1 | g2 | g2 |
| Camera 4 | g1 | g1 | g1 | g2 |

According to an embodiment of the present disclosure, the step of performing the spatial intersection to the sampling information in the dynamic scene may comprise: performing spatial projection according to silhouettes of images sampled by the cameras at each view angles to obtain the dynamic scene geometry model with a short exposure time less than the original exposure time, the dynamic scene geometry model has a time resolution larger than that of the nominal resolutions of the cameras. The short exposure time may be related to the time interval $\Delta t$ as described hereinabove.

Figure 9:
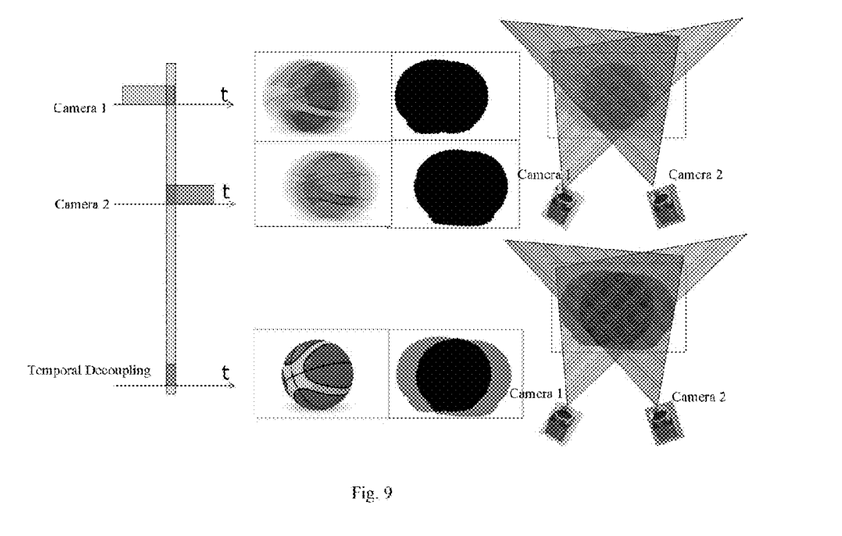
FIG. 9 is a schematic view of performing spatial intersection to acquire a dynamic scene geometry model according to an embodiment of the present disclosure.

The realization of the high-speed geometric model of the spatial silhouette intersection is as follows. The spatial projection is performed according to silhouette information of the images acquisited by cameras at each view angle, and spatial intersection is performed using the image silhouette visual hull algorithm commonly adopted in the art to obtain the dynamic scene geometry model corresponding to short exposure time, thereby realizing the reconstruction of the view subspace. As shown in FIG. 9, spatial silhouette projection intersection of the dynamic scene is performed to obtain the dynamic scene geometry model corresponding to short exposure time.

In FIG. 9, for easy understanding purpose, two cameras, i.e. Camera 1 and camera 2, are used for explaining the spatial intersection. The blurred images obtained by the cameras 1 and 2 at the corresponding view angles for the original exposure time, i.e. long exposure time, are shown in the upper portion of FIG. 9, after performing spatial projection intersection using the image silhouette visual hull algorithm, a de-blurred dynamic scene geometry model corresponding to the short exposure time shown in the lower part of the FIG. 9 is obtained.

Step 105: performing temporal decoupling for motion de-blurring to images in the sampling information with the silhouette motion constraints.

the step of performing temporal decoupling may comprise the steps of: performing temporal decoupling to the sampling information obtained from the spatial interleaved exposure sampling, the temporal interleaved exposure sampling and the exposure variant sampling to obtain the dynamic scene geometry model of the dynamic scene; and performing back projection of the dynamic scene geometry model to each view angle of the cameras to obtain silhouette information of the images with the third exposure time for motion de-blurring.

In step 105, after obtaining the dynamic scene geometry model, back projection of the dynamic scene geometry model is performed for each view angle of the cameras in the sampling system so that silhouette motion constraints corresponding to the original exposure time, i.e. the first exposure time, are obtained accordingly.

Figure 11:
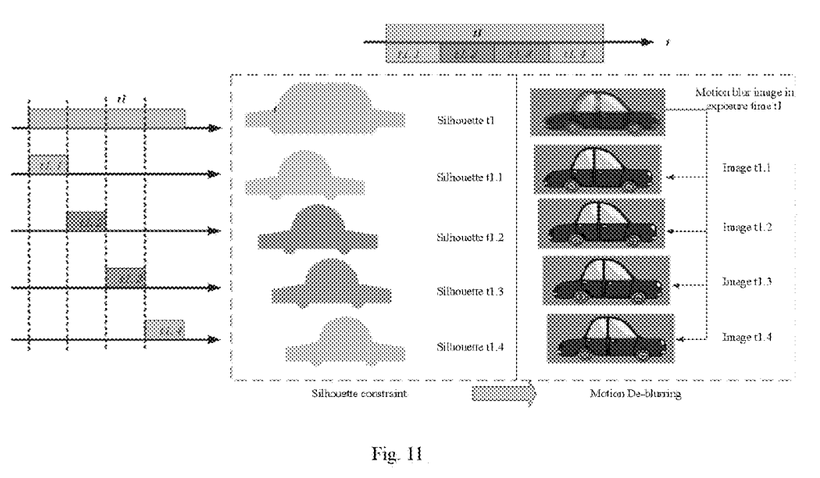
FIG. 11 is a schematic view of performing silhouette back projection to view angles of cameras based on silhouette motion constraints and temporal decoupling for motion de-blurring according to an embodiment of the present disclosure.

FIG. 11 is a schematic view of performing silhouette back projection to view angles of cameras based on silhouette motion constraints and temporal decoupling for motion de-blurring according to an embodiment of the present disclosure. As shown in FIG. 11, the silhouette information obtained by the cameras at different view angles (only one view angle is shown in FIG. 11) are coupled with motion information of the scene caused by motion blur. By using the silhouette motion constraints as shown in the middle column in FIG. 11 obtained in the step S104, the image t1 obtained under the original exposure time is intersected with the silhouette constraint in t1.1 so that the image t1.1 corresponding to the short exposure time t1.1 may be obtained, which possess the corresponding signal to noise ratio to that in the image t1. And the image t1.1 has no blurring. For similar reasons, images t1.2, t1.3 and t1.4 corresponding to the short exposure time t1.2, t1.3 and t1.4 are obtained without blurring. Through this step, by performing temporal decoupling for motion de-blurring to images in the sampling information with the silhouette motion constraints, images without blurring and having the corresponding signal to noise ratio to the original exposure time under the short exposure time may be decoupled from the blurred images obtained by the cameras under the original exposure time based on the temporal decoupling for motion de-blurring method or algorithm.

Step 106: reconstructing a dynamic scene 3D model corresponding to the multi-view dynamic scene with a resolution larger than nominal resolution of each camera by a 3D reconstructing algorithm.

In this step, after obtaining the images without blurring and having the corresponding signal to noise ratio to the original exposure time under the short exposure time, a 3D reconstructing algorithm may be used for reconstructing the dynamic scene 3D model. The dynamic scene 3D model has no image blurring or has reduced image blurring with corresponding signal to noise ratios to that under the original exposure time. That means the dynamic scene 3D model possess the texture, patterns etc for better representing the dynamic scene. According to an embodiment of the present disclosure, the dynamic scene 3D model may be reconstructed with a feature-matching 3D reconstructing algorithm.

According to an embodiment of the present disclosure, the method for vision field computing may further comprise an optimizing step of updating the dynamic scene geometry model based on the dynamic scene 3D model and iterating steps 104-106 until the difference between the resulted neighboring dynamic scene 3D models or between the resulted neighboring dynamic scene geometry models fall within a predetermined threshold. For example, the dynamic scene geometry model obtained in step 104 may be optimized until it reaches a predetermined threshold for the difference between the previously and currently obtained dynamic scene geometry models. Alternatively, the dynamic scene 3D model may be optimized in the steps 104-106 until it reaches a predetermined threshold for the difference between the previously and currently obtained dynamic scene 3D model. According to an embodiment of the present disclosure, temporal decoupling for motion de-blurring calculation is performed, which is iteratively optimized twice so that differences between the neighboring dynamic scene 3D models is smaller than the predetermined threshold. When the optimized result is smaller than the predetermined threshold, it may be considered that the optimized result has been converged with the textures under each view angle being incorporated into the dynamic scene 3D model, so that the iteratively optimizing may be stopped. Obviously, the predetermined threshold may be selected according to the practical conditions of the system.

Figure 10:
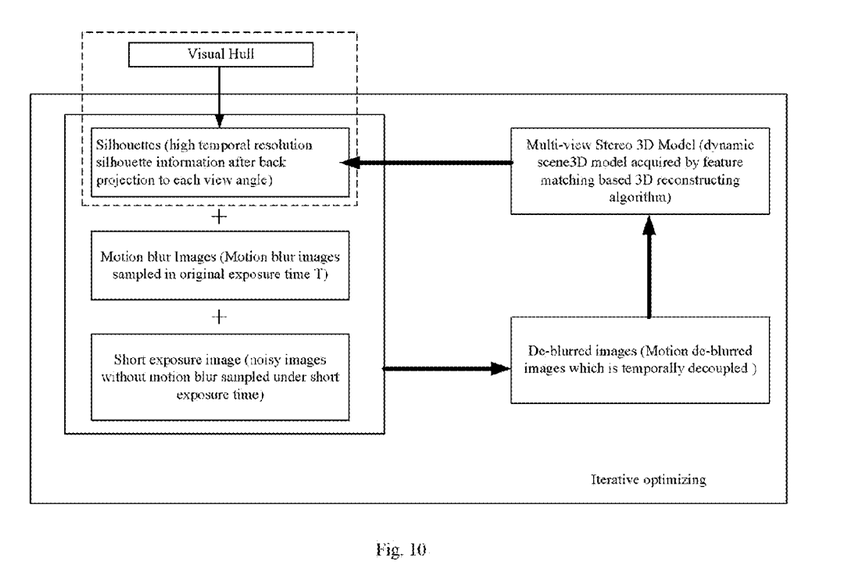
FIG. 10 is a block diagram of obtaining a dynamic scene 3D model according to an embodiment of the present disclosure.

FIG. 10 is a block diagram of obtaining a dynamic scene 3D model according to an embodiment of the present disclosure. Briefly, as shown in FIG. 10, motion blur images sampled in the original exposure time T may be temporal decoupled with the silhouette constrained obtained in the step S104 in combination with the exposure-variant sampling information to obtain de-blurred images which may be used for reconstructing the dynamic scene 3D model or multi-view stereo 3D model. As shown in FIG. 10, the multi-view stereo 3D model may be used to update the silhouette motion constraints after back projection to each view angle so that the steps S104-S106 may be iteratively performed until the dynamic scene 3D model is converged. Thus, the dynamic scene 3D model is optimized accordingly.

In the following, the flow chart for performing the method of the present disclosure will be described in detail with reference to FIGS. 10 and 11.

(1) Silhouette motion constraints of each view in an original exposure time period are acquired by silhouette back projection of each view for the dynamic scene geometry model with high temporal resolution. Due to motion blurring, the silhouette information in an original exposure time period is coupled with the motion information of the dynamic scene. Exposure decoupling is performed by the spatial interleaved sampling and the temporal interleaved exposure sampling to obtain a high-speed motion model of the dynamic scene, and back projection is performed for each view thereof according to the dynamic scene geometry model, so that silhouette information under short exposure is obtained, which is a vital constraint for the subsequent treatment.

As shown in the left two parts of FIG. 11, the $t_1$ time interval may be divided into 4 short exposure time $t_{1.1}$, $t_{1.2}$, $t_{1.3}$, and $t_{1.4}$ in the 4-camera temporal decoupling system, and the corresponding back projection silhouette information was obtained in the previous step.

(2) Based on the above motion de-blurring algorithm of silhouette constraints, 4 images corresponding to short exposure obtained by dividing a motion blurring image of each view in an original exposure time period have approximately the same signal to noise ratios as that in the original exposure time period but without motion blurring. This is a very underdetermined solution of the inverse problem. As shown in the rightmost part of FIG. 11, based on the above silhouette constraints with high temporal resolution, 4 images corresponding to 4 short exposure time $t_{1.1}$, $t_{1.2}$, $t_{1.3}$, and $t_{1.4}$ obtained by decomposing a motion blurring image acquisted in an original exposure time period $t_1$ have approximately the same signal to noise ratios as that in the original exposure time period but have no motion blurring.

(3) Based on the motion blurring image array of each view with high temporal resolution obtained through the above restoration, a 3D model of the dynamic scene in each intersection exposure time is solved by using a mainstream 3D reconstruction algorithm to obtain the dynamic scene 3D model with high precision.

Based on the dynamic scene 3D model with high precision, by repeating steps (1) to (3) as described hereinabove, the temporal decoupling results of the motion de-blurring images are optimized to obtain better texture images with high temporal resolution of each view, thus obtaining a 3D model with higher precision.

According to the above embodiments of the present disclosure, by spatial interleaved sampling, temporal exposure sampling and exposure-variant sampling, taking advantage of the intrinsic unified consistency between the spatial silhouette projection intersection and the exposure temporal intersection, the effective perception and capture for the high-speed motion scene may be realized with the conventional cameras having low resolution. According to the above embodiments of the present disclosure, without using expensive industrial level cameras, dynamic capture with high speed for the real 3D scene may be also realized, thus having very high commercial value with wide applicability.

It may be appreciated by those skilled in the art that, all the steps or some steps to realize the above embodiments may be completed by instructing a related hardware by a program. The program may be stored in a computer-readable storage medium. While executing the program, one of the above steps or combinations thereof may be completed.

Although explanatory embodiments have been shown and described, it would be appreciated by those skilled in the art that changes, alternatives, and modifications all falling into the scope of the claims and their equivalents can be made in the embodiments without departing from spirit and principles of the disclosure.

What is claimed is:

1. A method for vision field computing, comprising steps of:
   (1) forming a sampling system for a multi-view dynamic scene comprising N cameras discretely distributed in the dynamic scene for acquiring a vision field corresponding thereto, wherein view angles of the cameras entirely cover the dynamic scene, and the N is larger than 2;
   (2) controlling the cameras in the sampling system for the dynamic scene to perform spatial interleaved sampling, temporal interleaved exposure sampling and exposure-variant sampling in view-time 2D vision field subspace of the dynamic scene to acquire sampling information of the vision field subspaces in the dynamic scene from the view angles of the cameras;
   (3) performing spatial intersection to the sampling information in the view subspace of the dynamic scene and/or temporal intersection to the sampling information in the time subspace of the dynamic scene to reconstruct a dynamic scene geometry model corresponding to the multi-view dynamic scene;
   (4) performing silhouette back projection to the view angles of the cameras where the sampling information of the dynamic scene is obtained based on the dynamic scene geometry model to obtain silhouette motion constraints for the view angles of the cameras;

(5) performing temporal decoupling for motion de-blurring to images in the sampling information with the silhouette motion constraints; and (6) reconstructing a dynamic scene 3D model corresponding to the multi-view dynamic scene with a resolution larger than nominal resolution of each camera by a 3D reconstructing algorithm.

2. The method according to claim 1, wherein the dynamic scene 3D model is reconstructed with a feature-matching 3D reconstructing algorithm in step (6).

3. The method according to claim 1, wherein the sampling information in the time subspace of the dynamic scene has a resolution larger than a nominal resolution of the camera, and the spatial intersection is performed by an image silhouette visual hull algorithm to obtain the dynamic scene geometry model.

4. The method according to claim 1, wherein the step of performing the spatial interleaved sampling comprises:
performing exposure sampling successively by cameras with a first exposure time circularly distributed on a plane in the dynamic scene at an interval of K to perform the sampling of the dynamic scene, where K<(N−2), so that the sampling information of the dynamic scene in motion is obtained with the sampling system.

5. The method according to claim 4, wherein the step of performing the temporal interleaved exposure sampling comprises:
performing exposure sampling successively with the first exposure time at a time interval $\Delta t$ by the cameras in an order that is performed in the spatial interleaved sampling where a sampling period is completed when each camera in the sampling system is performed with exposure sampling once, the sum of the time intervals $\Delta t$ and the exposure time entirely cover the time subspace of the dynamic scene.

6. The method according to claim 5, wherein the step of performing the exposure-variant sampling includes:
performing exposure sampling to the dynamic scene by the cameras in the sampling system, where at least one camera has the first exposure time $T_1$ satisfying $T_1<T_{max}$ in which $T_{max}$ is a longest exposure time under the highest frame rate of the cameras, and at least another camera has a second exposure time $T_2$ satisfying $0<T_2<T_1$ during each sampling period.

7. The method according to claim 5, wherein the step of performing the temporal intersection to the sampling information in the dynamic scene comprises steps of:
performing time based intersection to silhouettes of images obtained in neighboring sampling periods for the cameras in the sampling system to obtain the dynamic scene geometry model with a third exposure time less than the first exposure time, the dynamic scene geometry model has a time resolution larger than that of the nominal resolutions of the cameras.

8. The method according to claim 4, wherein the step of performing the spatial intersection to the sampling information in the dynamic scene comprises:
performing spatial projection according to silhouettes of images sampled by the cameras at each view angles to obtain the dynamic scene geometry model with a third exposure time less than the first exposure time, the dynamic scene geometry model has a time resolution larger than that of the nominal resolutions of the cameras.

9. The method according to claim 7 or 8, wherein the third exposure time is related to the time interval $\Delta t$.

10. The method according to claim 9, wherein the step of performing temporal decoupling comprises the steps of
performing temporal decoupling to the sampling information obtained from the spatial interleaved exposure sampling, the temporal interleaved exposure sampling and the exposure variant sampling to obtain the dynamic scene geometry model of the dynamic scene; and
performing back projection of the dynamic scene geometry model to each view angle of the cameras to obtain silhouette information of the images with the third exposure time for motion de-blurring.

11. The method according to claim 1, further comprising an optimizing step of:
updating the dynamic scene geometry model based on the dynamic scene 3D model and iterating steps (4)-(6) until the difference between the resulted neighboring dynamic scene 3D models or between the resulted neighboring dynamic scene geometry models fall within a predetermined threshold.

12. The method according to claim 11, wherein the step of iteratively optimizing the dynamic scene 3D model comprises:
performing temporal decoupling for motion de-blurring calculation which is iteratively optimized twice so that differences between the neighboring dynamic scene 3D models is smaller than the predetermined threshold.

13. The method according to claim 12, wherein the multi-view dynamic scene sampling system comprises twenty cameras which is circularly disposed on a horizontal plane in the dynamic scene, and the exposure sampling is performed in turn by the cameras at an interval of seven to perform the spatial interleaved sampling.

* * * * *